United States Patent [19]

Shink

[11] Patent Number: 5,553,908
[45] Date of Patent: Sep. 10, 1996

[54] SUN SHIELD ASSEMBLY

[75] Inventor: Joseph M. Shink, Valencia, Calif.

[73] Assignee: Auto-Shade, Inc., Moorpark, Calif.

[21] Appl. No.: 573,596

[22] Filed: Dec. 15, 1995

Related U.S. Application Data

[63] Continuation of Ser. No. 244,954, filed as PCT/US92/08778, Oct. 14, 1992 published as WO94/08810, Apr. 28, 1994, abandoned.

[51] Int. Cl.$^6$ .................. B60J 3/00; F16B 47/00
[52] U.S. Cl. ................ 296/978; 160/370.21; 248/205.9
[58] Field of Search .................. 296/95.1, 97.7, 296/97.8, 136; 150/166, 168; 160/370.21; 248/205.5, 205.6, 205.7, 205.8, 205.9, 206.1, 206.2, 206.3

[56] References Cited

U.S. PATENT DOCUMENTS

| | | | |
|---|---|---|---|
| 3,338,293 | 8/1967 | Hohmann | 296/95.1 X |
| 3,879,005 | 4/1975 | Flick | 248/208.8 X |
| 4,196,882 | 4/1980 | Rognon | 248/205.9 |
| 4,815,784 | 3/1989 | Zheng | 296/97.7 |
| 5,024,262 | 6/1991 | Huang | 296/97.8 X |
| 5,035,460 | 7/1991 | Huang | 296/95.1 |
| 5,116,273 | 5/1992 | Chan | 160/370.2 |

FOREIGN PATENT DOCUMENTS

| | | | |
|---|---|---|---|
| 176926 | 3/1922 | United Kingdom | 296/97.7 |

*Primary Examiner*—Joseph D. Pape
*Attorney, Agent, or Firm*—Blakely Sokoloff Taylor & Zafman

[57] ABSTRACT

The present invention is a sun shield assembly that has a suction cup which can attach the shield to the windshield of an automobile. The shade has a flexible opaque sheet that is attached to a flexible frame. The frame is constructed to be folded and twisted into a plurality of concentric loops that can be placed in a pouch for storage.

6 Claims, 2 Drawing Sheets

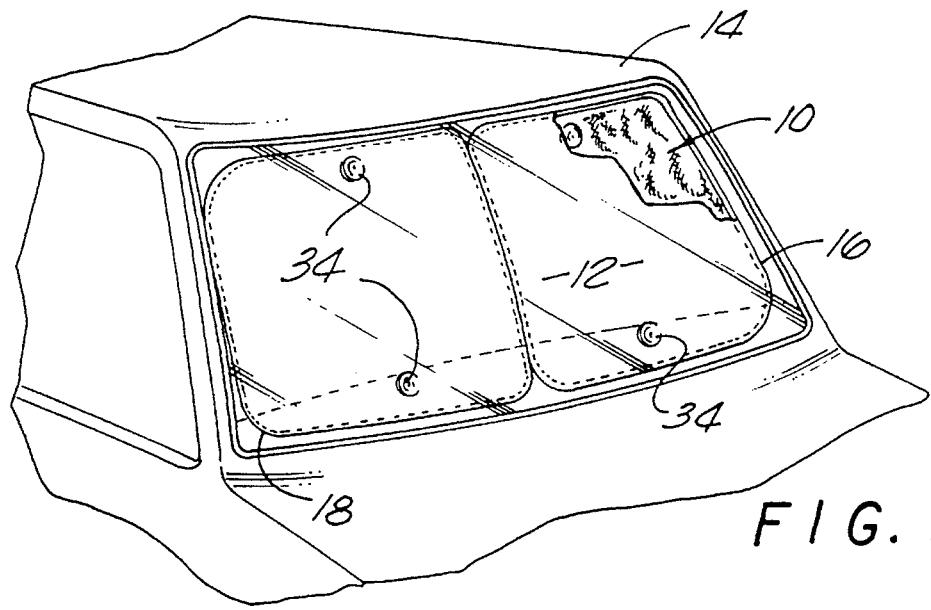
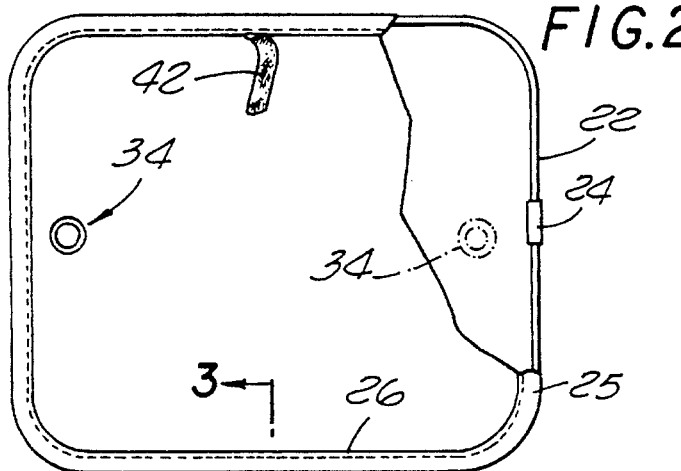
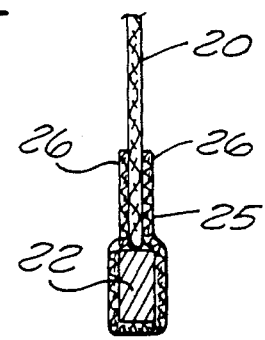
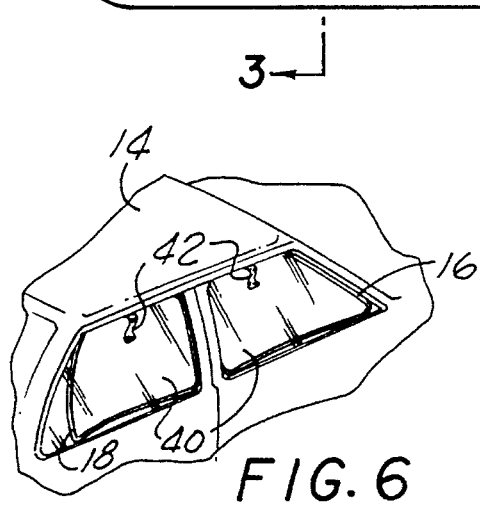
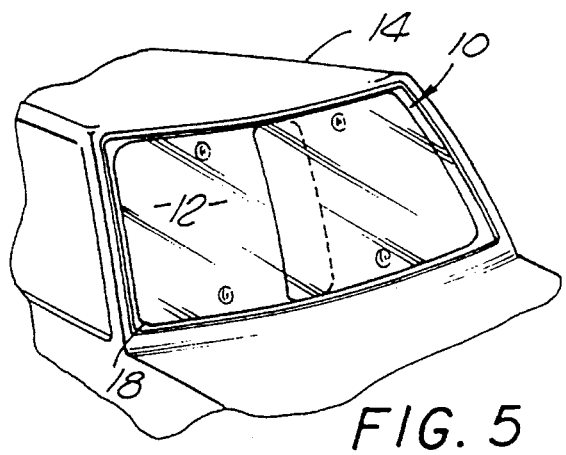

SUN SHIELD ASSEMBLY

This is a continuation of application Ser. No. 08/244,954 filed as PCT/US92/08778, Oct. 14, 1992 published as WO94/08810, Apr. 28, 1994, abandoned.

BACKGROUND OF THE INVENTION

1. Field of the Invention

The present invention relates to a collapsible sun shield that can be unfolded and attached to the window of an automobile.

2. Description of Related Art

It is sometimes desirable to cover the windows of an automobile to shield the interior of the car from the sun and heat. Some of the early car shades include simple cardboard sheets that are folded in an accordion-like fashion. The shades are typically unfolded and placed across the front windshield of a car. Because of the creases in the cardboard, accordion car shades have a tendency to contract toward the initial folded position. Additionally, even when fully folded, the accordion shades are somewhat bulky to pack and store.

U.S. Pat. No. 4,815,784 issued to Zheng discloses a sun shield that can cover the window(s) of an automobile. The Zheng sun shield has a pair of closed loop flexible frames that are covered and coupled by two opaque sheets of fabric material. The frames are separated by a hinge area which allows the loops to be placed on top of each other. The frames are then twisted and folded to form a plurality of smaller concentric loops which can then be stored. The hinge portion of the Zheng sun shield is unsupported and thus has a tendency to sag away from the window. The sagging material may allow light to enter the interior of the car and thus reduce the effectiveness of the sun shield.

U.S. Pat. No. 5,024,262 issued to Huang discloses a sun shield that has a single flexible frame covered by a pair of opaque sheets. The Huang sun shield is rectangular in shape and large enough to cover the windshield of a car. The frame is constructed to be twisted and folded into a plurality of concentric loops much like the Zheng device. Sun shields of the prior art are typically placed adjacent to the windshield and secured by rotating the visor of the car into contact with the shield. Such a method typically results in a portion of the shield being separated from the glass, such that light still enters the passenger compartment through the windshield. It would be desirable to have a sun shield that does not require a car visor and which places the entire shield adjacent to the windshield. It would also be desirable to have a suction cup which can be readily removed from the shade.

SUMMARY OF THE INVENTION

The present invention is a sun shield assembly that has a suction cup which can attach the shield to the windshield of an automobile. The shade has a flexible opaque sheet that is attached to a flexible frame. The frame is constructed to be folded and twisted into a plurality of concentric loops that can be placed in a pouch for storage. The suction cup couples the sheet to the windshield and is constructed to be easily removed from the opaque sheet, so that the frame can be folded into the concentric loops.

The shield is typically large enough to cover the windshield of most commercially available automobiles. The suction cup is coupled to the glass and places the entire shield adjacent to the windshield. The present invention therefore provides a sun shield assembly which completely covers the windshield of an automobile.

Therefore it is an object of the present invention to provide a foldable sun shield assembly that can place the entire shield adjacent to the windshield of an automobile.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a sun shield assembly of the present invention covering the windshield of an automobile;

FIG. 2 is a top view of a shade of the sun shield assembly of FIG. 1;

FIG. 3 is a cross-sectional view of the shade of FIG. 2, taken at line 3—3;

FIG. 5 is a perspective view similar to FIG. 1, showing the shades installed in an overlapping manner;

FIG. 6 is a perspective view showing a pair of sun shields covering the side windows of an automobile.

DETAILED DESCRIPTION OF THE INVENTION

Figure 2A:
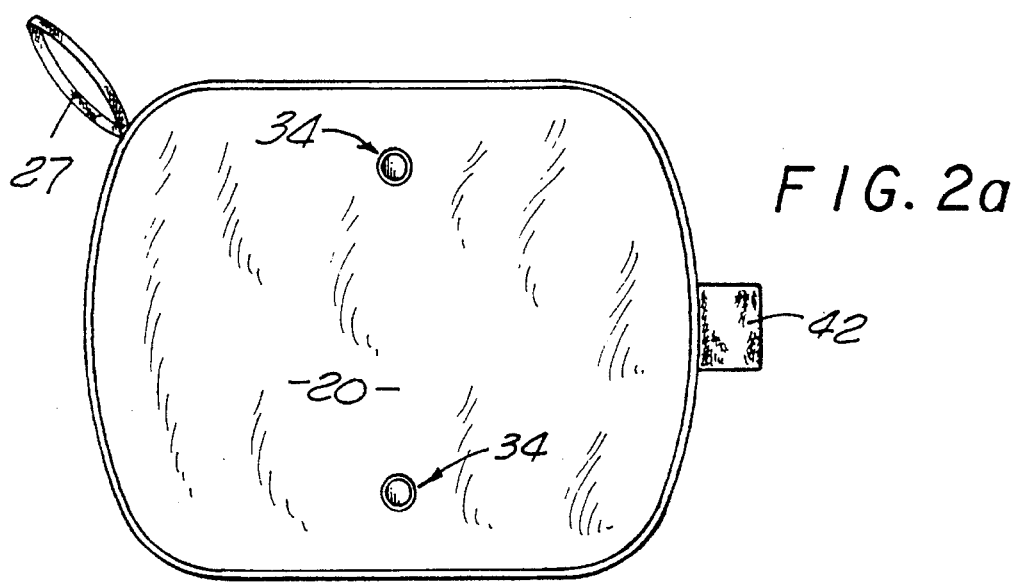
FIG. 2a is a top view of an alternate embodiment of the sun shield assembly.

Referring to the drawings more particularly by reference numbers, FIG. 1 shows a sun shield assembly 10 of the present invention installed onto the windshield 12 of an automobile 14. The sun shield 10 is used primarily to prevent the transmission of sunlight and heat into the interior of car. The sun shield also provides a cover that can visually conceal the contents of the passenger compartment. Although use of the sun shield assembly 10 in an automobile is shown and described, it is to be understood that the present invention may be used to cover other windows. For example, the assembly 10 may cover the window(s) of a commercial or residential building to shield the interior of the structure from sun and heat. The assembly 10 includes a first shade 16 and a second shade 18 each of similar construction.

Figure 2B:
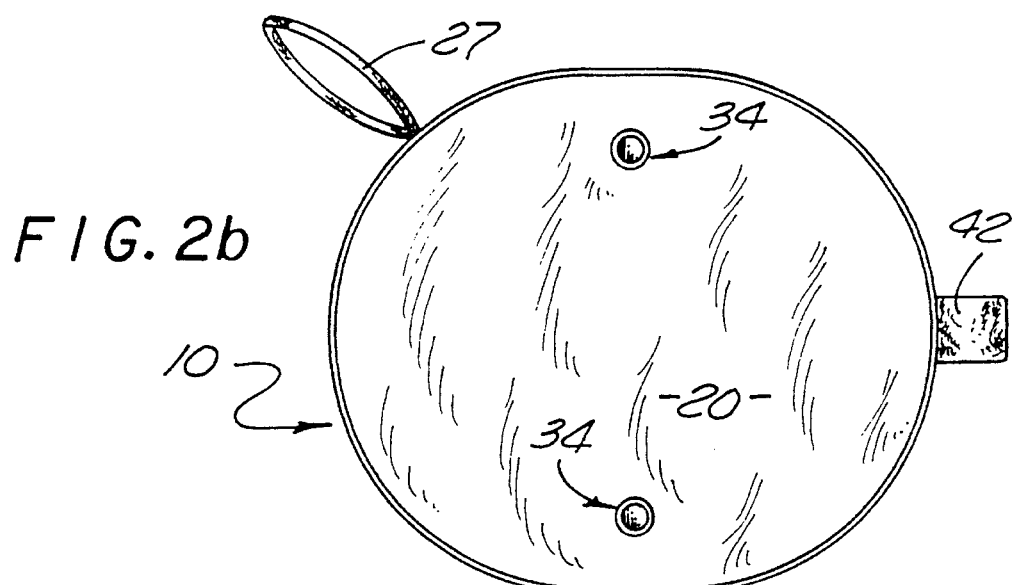
FIG. 2b is a top view of an alternate embodiment of the sun shield assembly.

As shown in FIG. 2, each shade has a flexible sheet 20 attached to a flexible frame 22. The frame 22 is typically constructed from a single strip that is bent into a closed loop and joined together by a clip 24 or other fastening means. As shown in FIG. 2a, the frame 22 may have rounded ends to more readily conform to the shape of an automobile window. Alternately, the frame 22 may have an elliptical shape as shown in FIG. 2b. The corners are rounded which improves the safety and appearance of the shade. The rounded corners also prevent tearing of the sheet 20. The clip 24 can be crimped or folded over the strip to securely fasten the ends of the frame 22. The strip is constructed from a spring-like metal or plastic that can be readily twisted and folded without yielding the material. In the preferred embodiment, the frame 22 is constructed from a steel wire, which is both flexible and strong.

The sheet 20 is attached to the frame 22 by a hem strip 25 that extends around the entire length of the frame. As shown in FIG. 3, the hem strip 25 is folded over the frame 22 and sewn to the sheet 20 at the edges 26 of the strip 25. The sheet 20 and strip 25 are typically constructed from a woven fabric that is both flexible and strong. The material is typically strong enough to hold the frame in the desired configuration. Alternately, the sheet 20 may be constructed from a thin plastic, reinforced paper, plasticized metal foil or a material sold by E. I. duPont de Nemour Inc., under the trademark TYVEK. The sheet 20 may also be constructed from a plurality of individual sheets laminated together. The sheet 20 is opaque and may be adapted to reflect light. The sheet 20 may include various colors, patterns or logos to improve the appearance of the shade. In the preferred embodiment, the sheet 20 is constructed from one layer of material, although it is understood that two or more layers may be used.

When the sun shield is not being used, the shades can be collapsed for storage. The preferred method of collapsing the sun shield includes placing the first shade 16 on top of the second shade 18. The user then grabs the opposite ends of the frames with both hands and twist the ends in opposite directions, while folding the shades inward until both shades form three overlapping loops. Each shade will typically collapse to approximately 40% of the original size. The shades generally remain in the collapsed condition without further restraint. The collapsed sun shield assembly can then be placed in a pouch (not shown) or other storage means. The shades may also have an elastic strap 27 that wraps around the shades in the collapsed condition to prevent the frames from unfolding.

Figure 4:
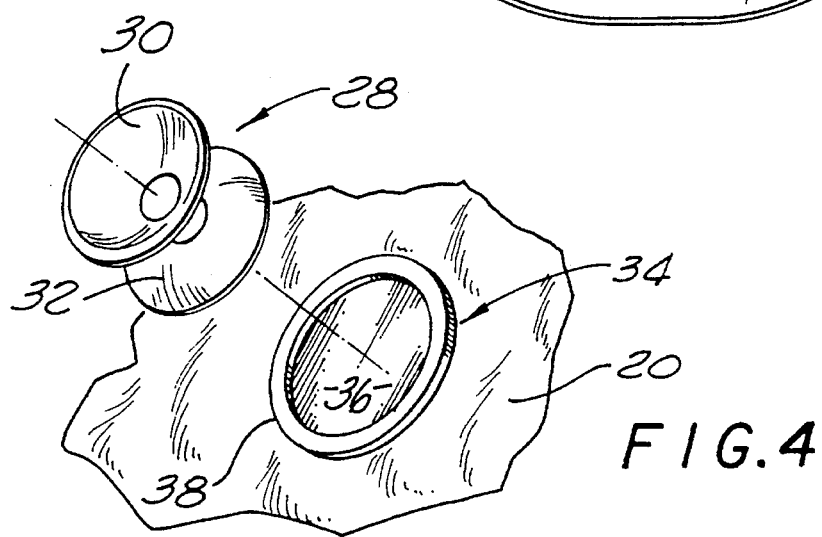
FIG. 4 is a perspective view showing a suction cup which can be attached to the shade to couple the sun shield to a windshield.

As shown in FIG. 4, the assembly includes a pair of suction cup assemblies 28 which can couple the sheet 20 to the window 12. Each cup assembly 28 preferable includes a first flexible conical cup 30 attached to a second flexible conical cup 32. The cups are typically constructed from rubber and are adapted to create a vacuum when depressed onto a smooth object, so that the cup is secured to the object. The first cup 30 is adapted to be coupled to the window 12 and the second cup 32 is adapted to be attached to an eyelet 34 that is sewn into the sheet 20. The eyelet 34 is typically constructed from plastic and has a smooth base surface 36 surrounded by an annular ring 38.

To install the sun shield 10, the shades 16 and 18 are unfolded and the suction cups assemblies 28 are attached to the grommet 34. The shades are then placed next to the window 12 and the grommet 34 are pushed to attach the first conical cups 30 to the glass 12. The opaque sheets prevent sunlight from shining into the passenger compartment. The shades also provide an additional thermal barrier that reduces the amount of heat flowing from the ambient into the interior of the car. In the preferred embodiment, the shades are each 30 inches long and 27 inches wide. The shades are large enough to collectively cover a typical windshield of an automobile.

As shown in FIG. 5, the shades can be installed in an overlapping fashion to accommodate windshields that are shorter than the combined length of both shades. The sun shield assembly of the present invention allows the user to install the same shades on vehicles having different windshield dimensions. The present invention also allows the manufacturer to produce a single shade size to fit various car models. Producing one size of shades decreases the cost of producing, marketing and selling the product. The inclusion of separate shades also allows the user to rotate the shades to cover cars having tall windshields.

As shown in FIG. 6, the shades can be used to cover the side windows 40 of an automobile. The sheets 20 typically have a tag 42 that can be used to attach the shades to the side windows 40. The tag 42 is placed on top of the glass and the window is rolled up until the tag 42 is pinched between the window and the window well of the car. The bottom of the shade may be supported by the door frame. The shade may also be secured to the window by constructing the shades to be slightly longer the height of the side window, so that the frame 22 exerts a spring force against the door and window frames. Although two shades 16 and 18 are shown and described, it is to be understood that a single shade may be used in the present invention.

While certain exemplary embodiments have been described in detail and shown in the accompanying drawings, it is to be understood that such embodiments are merely illustrative of and not restrictive on the broad invention and that this invention not be limited to the specific constructions and arrangements shown and described, since various other modifications may occur to those ordinarily skilled in the art.

What is claimed is:

1. An automobile sun shield assembly that can cover an automobile window, comprising:

a shade that includes a sheet of flexible opaque material attached to a frame, said frame being constructed as a single closed loop that can be twisted into a plurality of concentric loops;

a first flexible conical cup coupled to said flexible opaque material, said first flexible conical cup being adapted to be depressed onto the window to create a vacuum between said first flexible conical cup and the window such that said shade is attached to the window; and, a second flexible conical cup attached to said first flexible conical cup, said second flexible conical cup being adapted to be depressed onto a grommet attached to said flexible opaque material to couple said first flexible conical cup to said shade, the grommet forming a solid platform within the flexible material for adhesion of the second flexible conical cup.

2. The assembly as recited in claim 1, further comprising a second pair of flexible conical cups.

3. The assembly as recited in claim 1, wherein said frame and shade are essentially rectangular in shape.

4. The assembly as recited in claim 1, wherein said frame and shade are essentially elliptical in shape.

5. The assembly of claim 1, wherein the grommet is a solid metal disk.

6. The assembly of claim 1 wherein the grommet is a solid plastic disk.

\* \* \* \* \*